US009832726B2

(12) United States Patent
Yavuz et al.

(10) Patent No.: US 9,832,726 B2
(45) Date of Patent: *Nov. 28, 2017

(54) SYSTEMS AND METHODS FOR BLOCKING EXCESSIVE TRANSMITTER MESSAGE SIGNALING

(71) Applicant: Telefonaktiebolaget LM Ericsson (publ), Stockholm (SE)

(72) Inventors: Emre Yavuz, Stockholm (SE); Stefan Wänstedt, Luleå (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,734

(22) Filed: Aug. 12, 2016

(65) Prior Publication Data

US 2016/0353377 A1  Dec. 1, 2016

Related U.S. Application Data

(63) Continuation of application No. 13/896,801, filed on May 17, 2013, now Pat. No. 9,445,364.

(Continued)

(51) Int. Cl.
*G08C 17/00* (2006.01)
*H04W 52/02* (2009.01)
(Continued)

(52) U.S. Cl.
CPC ......... *H04W 52/0216* (2013.01); *H04L 69/28* (2013.01); *H04W 52/0209* (2013.01);
(Continued)

(58) Field of Classification Search
CPC .............................................. H04W 52/0216
(Continued)

(56) References Cited

U.S. PATENT DOCUMENTS 9,445,364 B2   9/2016 Yavuz et al.
2012/0252442 A1* 10/2012 Fu .................. H04W 24/10
                                              455/426.1

(Continued)

FOREIGN PATENT DOCUMENTS

EP    2056540 A1   5/2009
EP    2061192 A1   5/2009

(Continued)

OTHER PUBLICATIONS

Alcatel-Lucent, et al., "R2-125169: Correction on 'Power preference indication,'" Change Request 36.331, Version 11.1.0, 3rd Generation Partnership Project (3GPP), TSG-RAN WG2 Meeting #79bis, Oct. 8-12, 2012, 7 pages, Bratislava, Slovakia.

(Continued)

*Primary Examiner* — Iqbal Zaidi
(74) *Attorney, Agent, or Firm* — Withrow & Terranova, PLLC

(57) ABSTRACT

The present disclosure relates to transmitting assistance information from a first node to a second node. In one embodiment, a first node includes a wireless transmitter and a wireless receiver. In response to transmitting a preference indicator for a first configuration to a second node via the wireless transmitter or receiving a reconfiguration request associated with the preference indicator for the first configuration, the first node starts a timer set to a value that defines an amount of time before the first node is permitted to transmit a preference indicator for a second configuration to the second node. The first node then blocks transmission of the preference indicator for the second configuration to the second node until the timer has expired. In this manner, excessive signaling of preference indicators from the first node to the second node is avoided.

22 Claims, 8 Drawing Sheets

Related U.S. Application Data

(60) Provisional application No. 61/678,791, filed on Aug. 2, 2012.

(51) Int. Cl.
*H04W 76/04* (2009.01)
*H04L 29/06* (2006.01)

(52) U.S. Cl.
CPC ....... *H04W 76/046* (2013.01); *H04W 76/048* (2013.01); *Y02B 60/50* (2013.01)

(58) Field of Classification Search
USPC .................. 370/370, 235–311; 455/455, 418
See application file for complete search history.

(56) References Cited

U.S. PATENT DOCUMENTS

| | | |
|---|---|---|
| 2012/0307700 A1 | 12/2012 | Nordberg et al. |
| 2013/0336258 A1 | 12/2013 | Young et al. |
| 2014/0036750 A1 | 2/2014 | Yavuz et al. |
| 2016/0219508 A1 | 7/2016 | Yavuz et al. |

FOREIGN PATENT DOCUMENTS

| | | | | |
|---|---|---|---|---|
| EP | 2706794 | A2 | 3/2014 | |
| GB | WO 2011060998 | A1 * | 5/2011 | ......... H04W 76/046 |
| KR | 1020110110857 | A | 10/2011 | |
| KR | 1020120052410 | A | 5/2012 | |
| RU | 2335852 | C2 | 10/2008 | |
| RU | 2433571 | C2 | 11/2011 | |
| WO | 0217573 | A1 | 2/2002 | |
| WO | 2011102771 | A1 | 8/2011 | |
| WO | 2012099387 | A3 | 7/2012 | |
| WO | 2014049198 | A1 | 4/2014 | |

OTHER PUBLICATIONS

Author Unknown, "3rd Generation Partnership Project; Technical Specification Group Radio Access Network; Radio Resource Control (RRC); Protocol Specification (Release 11)," 3rd Generation Partnership Project (3GPP), Technical Specification 25.331, Version 11.5.0, Mar. 2013, 2,079 pages.

Ericsson et al., "Tdoc R2-125604: Discussion on the Existence and Operation of the PPI Prohibit Timer," 3rd Generation Partnership Project (3GPP), TSG-RAN WG2 #80, Nov. 12-16, 2012, 3 pages, New Orleans, Louisiana.

Holma, Harri et al., "Chapter 15: HSPA Evolution," WCDMA for UMTS: HSPA Evolution and LTE, Fifth Edition, Dec. 7, 2010, pp. 431-454, John Wiley & Sons, Ltd.

Nokia Corporation, "R2-122512: Summary of email discussion [77bis#25] LTE/EDDA: Assistance information," 3rd Generation Partnership Project (3GPP), TSG-RAN WG2 Meeting #78, May 21-25, 2012, 21 pages, Prague, Czech Republic.

Research in Motion UK Limited, "R2-121609: A Framework for Management of Background Traffic UEs," TSG-RAN WG2 Meeting #77bis, Mar. 26-30, 2012, 4 pages, Jeju, South Korea.

Non-Final Office Action for U.S. Appl. No. 13/896,801, dated Sep. 18, 2015, 13 pages.

Final Office Action for U.S. Appl. No. 13/896,801, dated Feb. 25, 2016, 13 pages.

Advisory Action and AFCP 2.0 Decision for U.S. Appl. No. 13/896,801, mailed Apr. 11, 2016, 4 pages.

Notice of Allowance for U.S. Appl. No. 13/896,801, dated May 6, 2016, 8 pages.

Notice of Reasons for Rejection for Japanese Patent Application No. 2015-524897, dated Apr. 5, 2016, 5 pages.

Notice of Preliminary Rejection for Korean Patent Application No. 2015-7005521, dated Nov. 10, 2015, 12 pages.

International Search Report and Written Opinion for PCT/IB2013/056331, dated Dec. 18, 2013, 18 pages.

International Preliminary Report on Patentability for International Patent Application No. PCT/IB2013/056331, dated Nov. 17, 2014, 15 pages.

Non-Final Office Action for U.S. Appl. No. 15/090,277, dated Oct. 20, 2016, 14 pages.

Notice of Allowance for Korean Patent Application No. 2015-7005521, dated Sep. 8, 2016, 3 pages.

First Examination Report for New Zealand Patent Application No. 705572, dated Sep. 30, 2016, 5 pages.

Official Action for Russian Patent Application No. 2015107042, dated Jul. 14, 2016, 16 pages.

\* cited by examiner

SYSTEMS AND METHODS FOR BLOCKING EXCESSIVE TRANSMITTER MESSAGE SIGNALING

RELATED APPLICATIONS

This application is a Continuation of U.S. patent application Ser. No. 13/896,801, filed May 17, 2013, now U.S. Pat. No. 9,445,364, which claims the benefit of provisional patent application Ser. No. 61/678,791, filed Aug. 2, 2012, the disclosures of which are hereby incorporated herein by reference in their entirety.

FIELD OF THE DISCLOSURE

The present disclosure relates to signaling of assistance information from a wireless transmitter to a wireless receiver and more specifically relates to blocking excessive signaling of assistance information from a wireless transmitter to a wireless receiver.

BACKGROUND

There are many scenarios in which a wireless device may frequently send messages to another wireless device to indicate a changing preference for a particular configuration for a connection between the wireless devices. One such scenario is within the context of a work item on enhancements for Diverse Data Applications (eDDA) in 3rd Generation Partnership Project (3GPP) Radio Access Network (RAN) Work Group 2 (WG2), which is referred to as 3GPP RAN2.

Efficient power consumption is one of the important characteristics of a wireless device (e.g., a User Equipment (UE), which is sometimes referred to as a user element) in a cellular communications network. In today's digital world, wireless devices tend to be always "connected" to the cellular communications network especially due to the popularity of social networking applications. These applications are usually delay-tolerant as opposed to other applications, such as video telephony or web browsing, that have traffic with delay-sensitive characteristics. Social networking applications generate intermittent packet transmissions that are usually small in size yet invoke procedures which prompt relatively high energy consumption. Hence, social networking applications may cause an inconvenient user experience due to the need to frequently recharge the battery of the wireless device (i.e., more than once per day).

3GPP has been developing the specifications on the Evolved Universal Terrestrial Radio Access Network (E-UTRAN), which includes Long Term Evolution (LTE) concepts. In RAN2, a Work Item (WI) on eDDA has been created in LTE Release 11 (Rel-11) to identify and specify mechanisms that can enhance the ability of LTE to handle diverse traffic profiles such as those of social networking applications. The objective of this WI is to identify improvements that can increase the network efficiency, extend UE battery lifetime, reduce signaling overhead, and enhance user experience and system performance under such traffic loads.

One of the focus areas is to change the UE behavior to reduce the power consumption of the UE when possible. In previous releases of the LTE specifications, timers were introduced to enable switching from CONNECTED to IDLE mode once the timers expire and when there is no data to send. Further, a Discontinuous Reception (DRX) mode was introduced for LTE in 3GPP standards to conserve battery power when the UE remains in CONNECTED mode. There is a wide range of configuration sets available for the DRX parameters which can be utilized for different types of services, e.g., Voice over Internet Protocol (VoIP), gaming, web browsing, and video telephony. DRX configuration is set by a base station, or eNodeB (eNB). However, there may be scenarios in which the UE has information that is not available at the base station that may be beneficial when setting the DRX configuration for the UE. As such, there is a need for systems and methods for signaling such information from the UE to the base station.

SUMMARY

The present disclosure relates to transmitting assistance information from a first node to a second node. In particular, systems and methods are disclosed for transmitting assistance information from a first node to a second node while avoiding excessive signaling. In one embodiment, a first node includes a wireless transmitter and a wireless receiver. In response to transmitting a preference indicator for a first configuration to a second node via the wireless transmitter or receiving a reconfiguration request associated with the preference indicator for the first configuration, the first node starts a timer set to a value that defines an amount of time before the first node is permitted to transmit a preference indicator for a second configuration to the second node. The first node then blocks transmission of the preference indicator for the second configuration to the second node until the timer has expired. In this manner, excessive signaling of preference indicators from the first node to the second node is avoided.

In one embodiment, the first node is a wireless device configured to operate in a cellular communications network, and the second node is a base station of the cellular communications network. Still further, in one embodiment, the preference indicator for the first configuration is a preference indicator for a normal power configuration, and the preference indicator for the second configuration is a preference indicator for a power efficient configuration.

In one embodiment, a wireless device configured to operate in a cellular communications network operates to initiate an assistance information procedure and perform the assistance information procedure to determine whether to block or initiate transmission of assistance information including a preference indicator for a desired power configuration to a base station of the cellular communications network. In one embodiment, performing the assistance information procedure includes determining whether the preference indicator for the desired power configuration is different than a most recent preference indicator transmitted by the wireless device to the base station. If so, the wireless device determines whether a timer has expired. In one embodiment, the timer is set to a value that defines an amount of time that must expire before transmission of the assistance information including the preference indicator for the desired power configuration and is started in response to transmitting the most recent preference indicator to the base station. If the timer has not expired, the wireless device blocks transmission of the assistance information including the preference indicator for the desired power configuration. If the timer has expired, the wireless device initiates transmission of the assistance information including the preference indicator for the desired power configuration.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
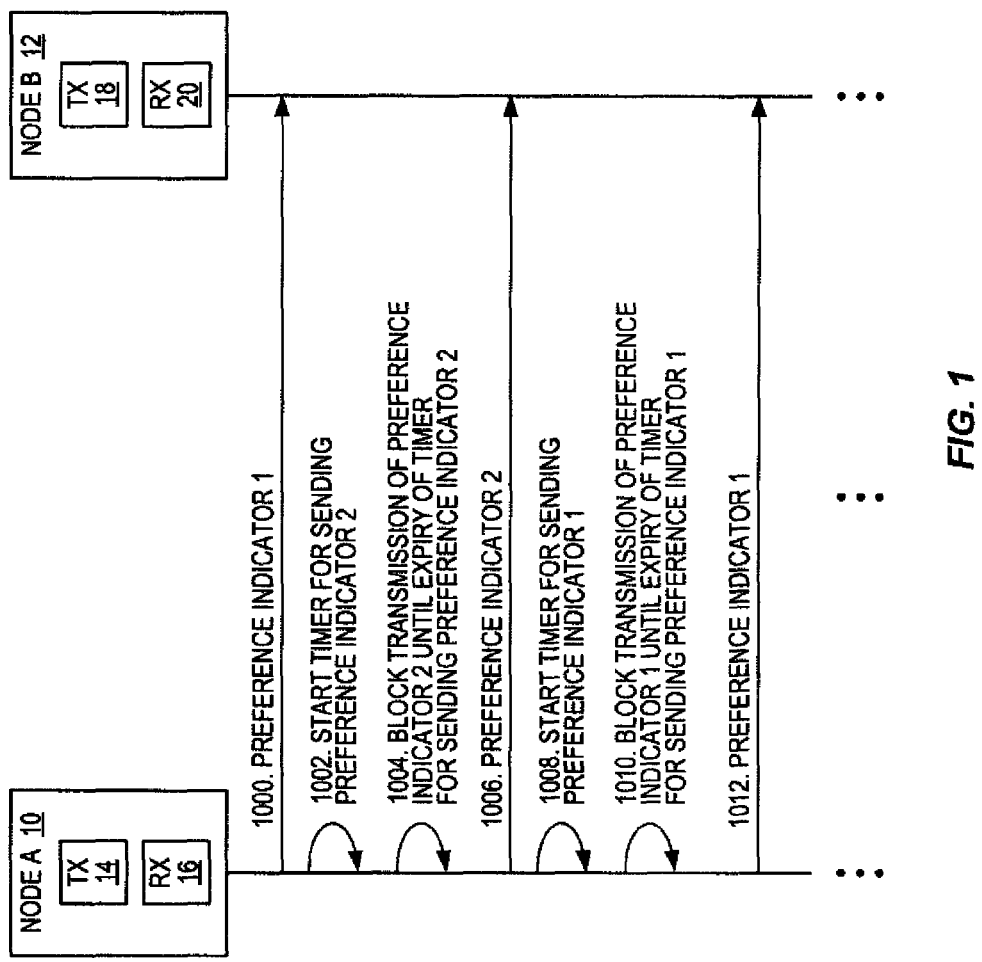
FIG. 1 illustrates the operation of a node including a wireless transmitter and a wireless receiver to avoid excessive signaling of assistance information to a second node according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to transmitting assistance information from a first node to a second node. In particular, systems and methods are disclosed for transmitting assistance information from a first node to a second node while avoiding excessive signaling. Before discussing embodiments of the present disclosure, a brief discussion of one problem addressed by the embodiments disclosed herein is beneficial. In many scenarios, it may be beneficial for a first node having a wireless transmitter and a wireless receiver to send information to a second node having a wireless transmitter and a wireless receiver to signal a change in a preference of the first node related to a wireless connection between the first and second nodes. However, frequently transmitting information containing the preference(s) of the first node to the second node may cause excessive signaling in a corresponding wireless network. It is beneficial or, in some cases, necessary to avoid such excessive signaling in order for the wireless network to utilize its resources more efficiently and thus provide a better service experience to its users. Thus, as discussed below in detail, embodiments disclosed herein provide mechanisms by which preference information, or any other type of assistance information, can be communicated from the first node to the second node while avoiding excessive signaling.

One particular wireless network in which excessive signaling of assistance information may occur is in cellular communications networks operating according to the Long Term Evolution (LTE) Release 11 (Rel-11) and subsequent specifications. More specifically, the extension of wireless device, or User Equipment or User Element (UE), battery lifetime is considered to be a challenge in the Evolved Universal Terrestrial Radio Access Network (E-UTRAN) consisting of LTE and System Architecture Evolution (SAE) concepts. Enhanced Discontinuous Reception (DRX) mode is introduced for LTE in $3^{rd}$ Generation Partnership Project (3GPP) standards to conserve battery power when the wireless device is in CONNECTED mode. There are a wide range of configuration sets available for the DRX parameters, which can serve for different types of services, e.g., gaming, web browsing, and video telephony. DRX configuration is normally set by a base station, or eNodeB (eNB). However, there may be scenarios in which the wireless device has information that is not available at the base station. For example, the wireless device may have information that indicates that a user of the wireless device prefers delay-tolerant operation for a longer battery life. This information could assist the base station in deciding which DRX configuration to use for the wireless device. Therefore, such information, hereafter referred to as assistance information, is considered useful to the base station. Notably, as used herein, "assistance information" is any information known to a first node that that is considered useful to a second node. In one preferred embodiment, assistance information is information that is indicative of a preference for DRX settings that indicates a wireless device's, or UE's, willingness for delay-sensitive or delay-tolerant operation and thus its power preference.

While the transmission of assistance information, such as a power preference, from a first node to a second node is considered beneficial for enhancing a battery lifetime of the first node, the inventors have found that excessive signaling of assistance information may occur due to frequent change of preferences if triggering is left to the first node for implementation and no mechanism is provided to block excessive signaling of assistance information. Excessive signaling may result not only in an increase in power consumption at the first node but also in poor service quality for other nodes in the cellular communications network due to signaling overload in the second node. As such, there is a need for mechanisms to avoid such excessive signaling in order to be able to benefit from the battery lifetime gain resulting from the signaling of the assistance information to the base station. At the same time, it is also important to allow the first node to indicate to the second node that its preference has changed in a timely manner, which is particularly important when the first node starts using delay-sensitive services or applications.

Notably, transmissions of assistance information may be limited using a timer similar to the network configured timer (T323) in Wideband Code Division Multiple Access (WCDMA) cellular communications networks. A mechanism has been specified for WCDMA in 3GPP Technical Specification (TS) 25.331 that requires the expiration of a receiver configured timer before releasing the signaling connection rather than just releasing the signaling connection when the wireless device desires. In WCDMA, this timer is configurable by the cellular communications network and is available in the system broadcast. Once the timer expires, the wireless device can send a signaling connection release indication message.

In WDCMA, all preference indicator messages to be sent by the wireless device, regardless of their sensitivity to delay, must wait for the same amount of time to expire. However, the inventors have found that some preference indicators may be associated with delay-sensitive operations and therefore need to be transmitted sooner than other preference indicators. For instance, in LTE, a DRX power preference indicator for a normal, or default, power configuration may be delay sensitive (i.e., intolerant to delay) whereas a DRX power preference indicator for a power efficient configuration may be delay insensitive (i.e., tolerant to delay). Thus, switching from a delay tolerant (i.e., power efficient) operation to a delay sensitive operation should be prioritized compared to switching from a delay sensitive operation to a delay tolerant operation. As such, as discussed below, embodiments of the present disclosure avoid excessive signaling utilizing a timer that can be set to different values depending on the content of the assistance information to be transmitted.

In this regard, FIG. 1 illustrates the operation of a node 10 to signal assistance information to a node 12 in a manner that avoids excessive signaling according to one embodiment of the present disclosure. The node 10 includes a wireless transmitter (TX) 14 and a wireless receiver (RX) 16. Likewise, the node 12 includes a wireless transmitter 18 and a wireless receiver 20. As discussed below, in one embodiment, the node 10 is a wireless device (e.g., a UE) in a cellular communications network, and the node 12 is a base station of the cellular communications network. However, the nodes 10 and 12 are not limited thereto. Rather, the nodes 10 and 12 are any type of devices in any type of wireless network in which transmission of assistance information from the node 10 to the node 12 is beneficial. Again, the assistance information is generally any information known to the node 10 that is beneficial to the node 12. In one embodiment, the assistance information is information known to the node 10 that is beneficial to the node 12 when configuring a wireless connection between the nodes 10 and 12. Still further, in one particular embodiment, the assistance information is or includes a preference indicator for a power configuration for the wireless connection between the node 10 and the node 12. For example, the preference indicator may be a preference indicator for a normal power configuration or a preference indicator for a power efficient configuration. As one particular example, the preference indicator may be a preference indicator for a normal power configuration for a DRX mode of operation of the node 10 or a preference indicator for a power efficient configuration for the DRX mode of operation of the node 10.

In the embodiment of FIG. 1, the assistance information is a preference indicator for a desired configuration (e.g., a desired power configuration) for a wireless connection between the nodes 10 and 12. As illustrated, the node 10 transmits a preference indicator for a first configuration (preference indicator 1) to the node 12 via the wireless transmitter 14 of the node 10 (step 1000). The first configuration is a first configuration (e.g., a normal power configuration) for a wireless connection between the nodes 10 and 12. While not illustrated, the node 12 utilizes the preference indicator from the node 10 to decide whether to reconfigure the wireless connection. Note, however, that the node 12 does not necessarily reconfigure the wireless connection in response to reception of the preference indicator. The decision of the node 12 may be made based on additional factors.

In response to transmitting the preference indicator for the first configuration to the node 12, the node 10 starts a timer that is set to a value that defines an amount of time that must expire before the node 10 is permitted to transmit a preference indicator for a second configuration (preference indicator 2) to the node 12 (step 1002). The second configuration is a second configuration (e.g., a power efficient configuration) for the wireless connection between the nodes 10 and 12. The value to which the timer is set can vary depending on the particular implementation. In general, the value for the timer may be any value greater than or equal to zero. However, in one preferred embodiment, the value to which the timer is set is inversely related to a delay sensitivity of operations associated with the second configuration. In other words, in one preferred embodiment, the value to which the timer is set is a function of the preference indicator for which the node 10 is to block transmission until the timer has expired. As an example, if the second configuration is a power efficient configuration associated with operations which are delay insensitive (or delay tolerant), then the value to which the timer is set may be large (i.e., larger than a value that would be used for a normal power configuration). As one particular example, the value for the timer for the preference indicator for the second configuration where the second configuration is associated with delay insensitive operations may be tens or hundreds of seconds.

Once the timer is started, the node 10 then blocks transmission of the preference indicator for the second configuration to the node 12 until the timer started in step 1002 has expired (step 1004). More specifically, events at the node 10 can trigger an attempt to transmit the preference indicator for the second configuration. For example, if the second configuration is a power efficient configuration, a user of the node 10 may place the node 10 in a power efficient mode. In response, the node 10 may attempt to transmit the preference indicator for the power efficient configuration for the wireless connection to the node 12. If the timer started in step 1002 has not expired, the node 10 blocks transmission of the preference indicator for the power efficient configuration. In this manner, excessive signaling of preference indicators from the node 10 to the node 12 is prevented. At some point, after the timer has expired, the node 10 transmits the preference indicator for the second configuration to the node 12 via the wireless transmitter 14 (step 1006). In other words, once the timer has expired, the node 10 permits transmission of the preference indicator for the second configuration to the node 12.

In this embodiment, in response to transmitting the preference indicator for the second configuration in step 1006, the node 10 starts a timer set to a value that defines an amount of time that must expire before the node 10 is permitted to transmit a preference indicator for the first configuration (preference indicator 1) to the node 12 (step 1008). Notably, the timer for step 1008 is preferably the same timer as used for steps 1002 and 1004 above but where the timer is set to a different value. The value to which the timer is set can vary depending on the particular implementation. In general, the value for the timer may be any value greater than or equal to zero. However, in one preferred embodiment, the value to which the timer is set is inversely related to a delay sensitivity of operations associated with the first configuration. In other words, in one preferred embodiment, the value to which the timer is set is a function of the preference indicator for which the node 10 is to block transmission until the timer has expired. As an example, if the first configuration is a normal power configuration associated with operations which are delay sensitive (or delay intolerant), then the value to which the timer is set may be small (i.e., smaller than the value used for the timer for the power efficient configuration). As one particular example, the value for the timer for preference indicator for the first configuration where the first configuration is associated with operations that are delay sensitive may be zero or near zero (e.g., less than 1 second).

Once the timer is started in step 1008, the node 10 then blocks transmission of the preference indicator for the first configuration to the node 12 until the timer started in step 1008 has expired (step 1010). More specifically, events at the node 10 can trigger an attempt to transmit the preference indicator for the first configuration. For example, the user of the node 10 may place the node 10 in a normal mode. In response, the node 10 may attempt to transmit the preference indicator for the normal power configuration for the wireless connection to the node 12. If the timer started in step 1008 has not expired, the node 10 blocks transmission of the preference indicator for the normal power configuration. In this manner, excessive signaling of preference indicators from the node 10 to the node 12 is prevented. At some point, after the timer has expired, the node 10 transmits the preference indicator for the first configuration to the node 12 via the wireless transmitter 14 (step 1012). In other words, once the timer has expired, the node 10 permits transmission of the preference indicator for the first configuration to the node 12. The process may then continue in the manner described above.

Figure 2:
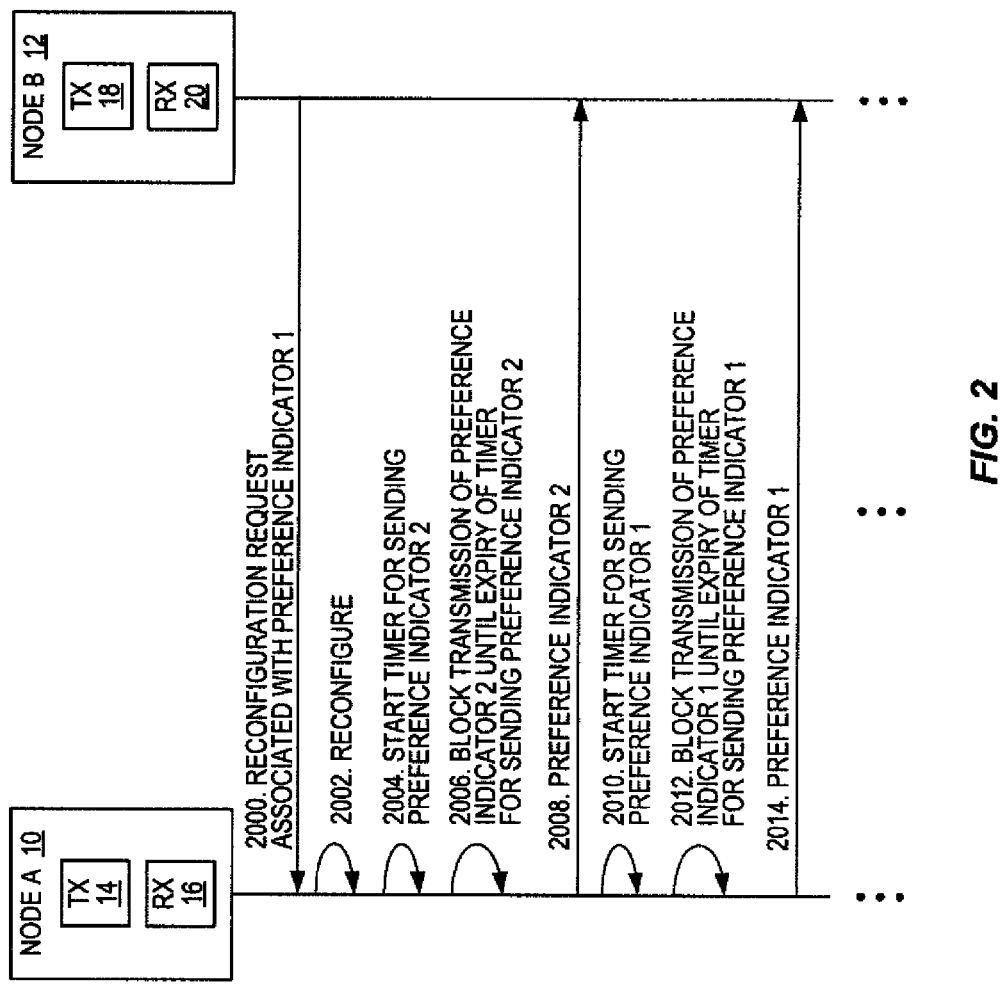
FIG. 2 illustrates the operation of a node including a wireless transmitter and a wireless receiver to avoid excessive signaling of assistance information to a second node according to another embodiment of the present disclosure.

As discussed above, FIG. 1 illustrates an embodiment where the timer(s) is(are) started in response to transmission of a preference indicator from the node 10 to the node 12. However, in another embodiment, the timer(s) can be started in response to reception, by the node 10, of a reconfiguration request associated with a preference indicator from the node 12. Thus, in one embodiment, the timer(s) may be started in response to either transmission of a preference indicator by the node 10 or reception of a reconfiguration request associated with a preference indicator by the node 10. More specifically, as illustrated in FIG. 2, the node 10 receives a reconfiguration request associated with the preference indicator for the first configuration (preference indicator 1) from the node 12 via the wireless receiver 16 of the node 10 (step 2000). The node 10 then reconfigures itself for the first configuration in response to the reconfiguration request (step 2002).

In response to receiving the reconfiguration request associated with the preference indicator for the first configuration, the node 10 starts the timer that is set to the value that defines the amount of time that must expire before the node 10 is permitted to transmit the preference indicator for the second configuration (preference indicator 2) to the node 12 (step 2004). As discussed above, the value to which the timer is set can vary depending on the particular implementation. In general, the value for the timer may be any value greater than or equal to zero. However, in one preferred embodiment, the value to which the timer is set is inversely related to a delay sensitivity of operations associated with the first configuration. In other words, in one preferred embodiment, the value to which the timer is set is a function of the preference indicator for which the node 10 is to block transmission until the timer has expired. Once the timer is started, the node 10 then blocks transmission of the preference indicator for the second configuration to the node 12 until the timer started in step 2004 has expired (step 2006). In this manner, excessive signaling of preference indicators from the node 10 to the node 12 is prevented. At some point, after the timer has expired, the node 10 transmits the preference indicator for the second configuration to the node 12 via the wireless transmitter 14 (step 2008). In other words, once the timer has expired, the node 10 permits transmission of the preference indicator for the second configuration to the node 12.

In this embodiment, in response to transmitting the preference indicator for the second configuration in step 2008 (or alternatively receiving a reconfiguration request associated with the preference indicator for the second configuration from the node 12), the node 10 starts the timer set to the value that defines the amount of time that must expire before the node 10 is permitted to transmit the preference indicator for the first configuration (preference indicator 1) to the node 12 (step 2010). Again, the value to which the timer is set can vary depending on the particular implementation. In general, the value for the timer may be any value greater than or equal to zero. However, in one preferred embodiment, the value to which the timer is set is inversely related to a delay sensitivity of operations associated with the first configuration. In other words, in one preferred embodiment, the value to which the timer is set is a function of the preference indicator for which the node 10 is to block transmission until the timer has expired. Once the timer is started in step 2010, the node 10 then blocks transmission of the preference indicator for the first configuration to the node 12 until the timer started in step 2010 has expired (step 2012). In this manner, excessive signaling of preference indicators from the node 10 to the node 12 is prevented. At some point, after the timer has expired, the node 10 transmits the preference indicator for the first configuration to the node 12 via the wireless transmitter 14 (step 2014). In other words, once the timer has expired, the node 10 permits transmission of the preference indicator for the first configuration to the node 12. The process may then continue in the manner described above.

Figure 3:
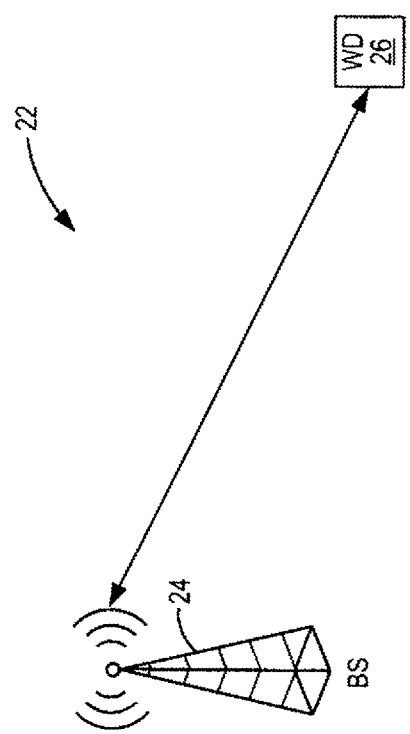
FIG. 3 illustrates a base station of a cellular communications network and a wireless device, wherein the wireless device operates to avoid excessive signaling of assistance information to the base station according to one embodiment of the present disclosure.

While FIGS. 1 and 2 illustrate embodiments that are applicable to any type of nodes 10 and 12 equipped with wireless transmitters 14 and 18 and wireless receivers 16 and 20, FIGS. 3 through 9 illustrate embodiments in which excessive signaling of assistance information in a cellular communications network 22 is avoided. For these embodiments, the cellular communications network 22 is preferably a 3GPP LTE cellular communications network. However, it should be appreciated that the systems and methods disclosed herein can also be used for other types of cellular communications networks. In this regard, FIG. 3 illustrates a base station (BS) 24 and a wireless device (WD) 26 in the cellular communications network 22. For LTE, the base station 24 is also referred to as an eNB, and the wireless device 26 is also referred to as a UE. Note that the base station 24 may alternatively be a low power base station (e.g., a pico or femto base station).

Figure 4:
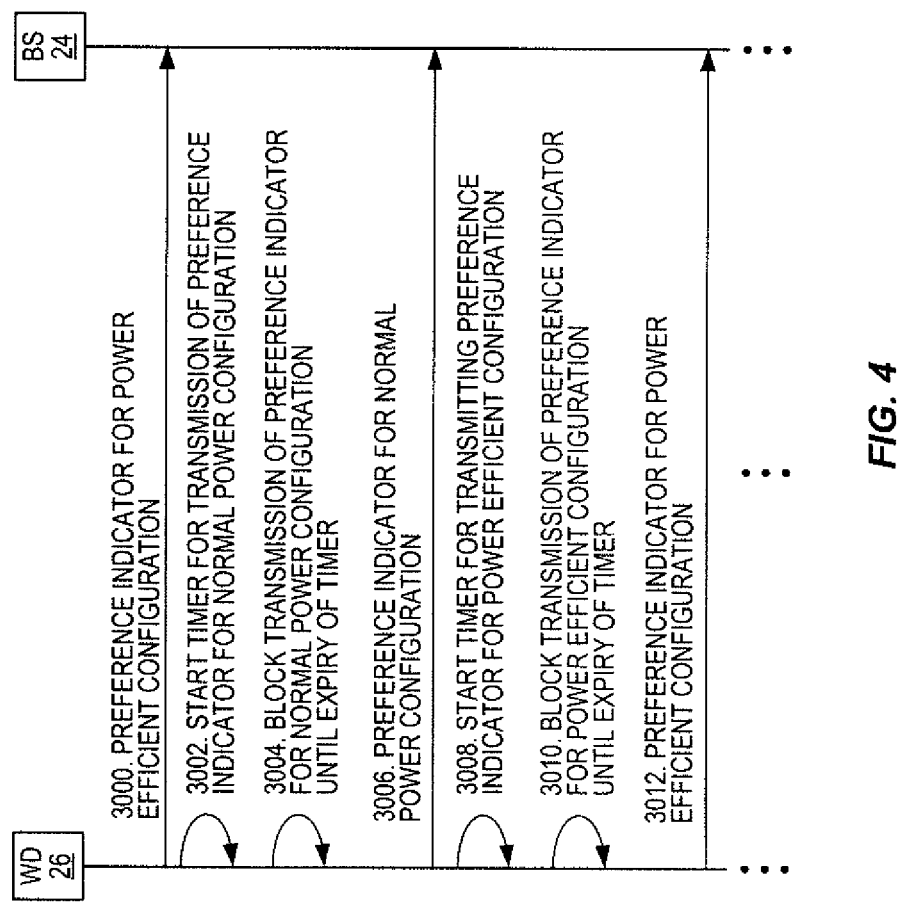
FIG. 4 illustrates the operation of the wireless device of FIG. 3 to avoid excessive signaling of assistance information to the base station according to one embodiment of the present disclosure.

FIG. 4 illustrates the operation of the wireless device 26 of FIG. 3 to signal assistance information to the base station 24 in a manner that avoids excessive signaling according to one embodiment of the present disclosure. As illustrated, the wireless device 26 transmits a preference indicator for a power efficient configuration to the base station 24 (step 3000). The preference indicator for the power efficient configuration is preferably a preference indicator for a power efficient DRX configuration, which is preferably associated with one or more delay insensitive, or delay tolerant, operations. In particular embodiments, the power efficient configuration represents a configuration in which the UE consumes less power and/or otherwise operates in a more power efficient manner than a normal configuration (such as a default configuration) under which the UE would otherwise operate. In one embodiment, the preference indicator for the power efficient configuration is one of a predefined set of preference indicators including the preference indicator for the power efficient configuration and a preference indicator for a normal, or default, power configuration. Further, while the preference indicator may be transmitted using any suitable mechanism, in one embodiment, the preference indicator is transmitted via a Radio Resource Control (RRC) or Media Access Control (MAC) message.

While not illustrated, the base station 24 utilizes the preference indicator from the wireless device 26 to decide whether to reconfigure the wireless connection. In one preferred embodiment, the base station 24 utilizes the preference indicator from the wireless device 26 to select one set of DRX parameters from multiple predefined sets of DRX parameters that are suitable for different types of services, e.g., Voice over Internet Protocol (VoIP), video telephony, gaming, web browsing, etc. Note, however, that the base station 24 does not necessarily reconfigure the wireless connection in response to reception of the preference indicator. The decision of the base station 24 may be made based on additional factors.

In response to transmitting the preference indicator for the power efficient configuration to the base station 24, the wireless device 26 starts a timer that is set to a value that defines an amount of time that must expire before the wireless device 26 is permitted to transmit the preference indicator for the normal power configuration to the base station 24 (step 3002). The preference indicator for the normal power configuration is preferably a preference indicator for a normal power DRX configuration, which is preferably associated with one or more delay sensitive, or delay intolerant, operations. The value to which the timer is set can vary depending on the particular implementation. In general, the value for the timer may be any value greater than or equal to zero. However, in one preferred embodiment, the value to which the timer is set is inversely related to a delay sensitivity of operations associated with the normal power configuration. In this embodiment, the normal power configuration is associated with one or more operations that are delay sensitive and, as such, the value to which the timer is set is small (i.e., smaller than a value that would be used for the power efficient configuration). As an example, the value to which the timer is set in step 3002 may be zero or some value near zero (e.g., a value that is less than 1 second). In this manner, when a triggering event occurs for switching from the power efficient configuration to the normal power configuration, there will be a small or no delay before transmitting the preference indicator for the normal power configuration to the base station 24.

Once the timer is started, the wireless device 26 then blocks transmission of the preference indicator for the normal power configuration to the base station 24 until the timer started in step 3002 has expired (step 3004). More specifically, events at the wireless device 26 can trigger an attempt to transmit the preference indicator for the normal power configuration. For example, a user of the wireless device 26 may switch the wireless device 26 from a power efficient mode of operation to a normal power mode of operation. In response, the wireless device 26 attempts to transmit the preference indicator for the normal power configuration. If the timer started in step 3002 has not expired, the wireless device 26 blocks transmission of the preference indicator for the normal power configuration. In this manner, excessive signaling of preference indicators from the wireless device 26 to the base station 24 is prevented. At some point, after the timer has expired, the wireless device 26 transmits the preference indicator for the normal power configuration to the base station 24 (step 3006). In other words, once the timer has expired, the wireless device 26 permits transmission of the preference indicator for the normal power configuration to the base station 24.

In this embodiment, in response to transmitting the preference indicator for the normal power configuration in step 3006, the wireless device 26 starts a timer set to a value that defines an amount of time that must expire before the wireless device 26 is permitted to transmit the preference indicator for the power efficient configuration to the base station 24 (step 3008). Notably, the timer for step 3008 is preferably the same timer as used for steps 3002 and 3004 above but is set to a different value. The value to which the timer is set can vary depending on the particular implementation. In general, the value for the timer may be any value greater than or equal to zero. However, in one preferred embodiment, the value to which the timer is set is inversely related to a delay sensitivity of operations associated with the power efficient configuration. In this embodiment, the one or more operations associated with the power efficient configuration are delay insensitive and, as such, the value to which the timer is set is large (i.e., larger than the value that is used for the normal power configuration). As an example, the value to which the timer is set in step 3008 may be tens or hundreds of seconds.

Once the timer is started in step 3008, the wireless device 26 then blocks transmission of the preference indicator for the power efficient configuration to the base station 24 until the timer started in step 3008 has expired (step 3010). More specifically, events at the wireless device 26 can trigger an attempt to transmit the preference indicator for the power efficient configuration. For example, the user of the wireless device 26 may switch the wireless device 26 from the normal mode of operation to the power efficient mode of operation. In response, the wireless device 26 attempts to transmit the preference indicator for the power efficient configuration for the wireless connection. If the timer started in step 3008 has not expired, the wireless device 26 blocks transmission of the preference indicator for the power efficient configuration. In this manner, excessive signaling of preference indicators from the wireless device 26 to the base station 24 is prevented. At some point, after the timer has expired, the wireless device 26 transmits the preference indicator for the power efficient configuration to the base station 24 (step 3012). In other words, once the timer has expired, the wireless device 26 permits transmission of the preference indicator for the power efficient configuration to the base station 24. The process may then continue in the manner described above.

As discussed above, FIG. 4 illustrates an embodiment where the timer(s) is(are) started in response to transmission of a preference indicator from the wireless device 26 to the base station 24. However, in another embodiment, the timer(s) can be started in response to reception, by the wireless device 26, of a reconfiguration request associated with a preference indicator from the base station 24. Thus, in one embodiment, the timer(s) may be started in response to either transmission of a preference indicator or reception of a reconfiguration request associated with a preference indicator.

Before proceeding, it should be noted that the preference indicators for the power efficient and normal power configurations may be part of a larger set of preference indicators. Each preference indicator may correspond to a different set of configuration parameter values at the base station 24. In this case, the timer or different timers may be set to different values and may be utilized to block excessive transmission of the other preference indicators as desired. However, in one embodiment, no timer may be used for one or more of the preference indicators. In other words, it is not necessary for the timer or some other timer to be used to block excessive signaling for all of the preference indicators in the predefined set.

Figure 5:
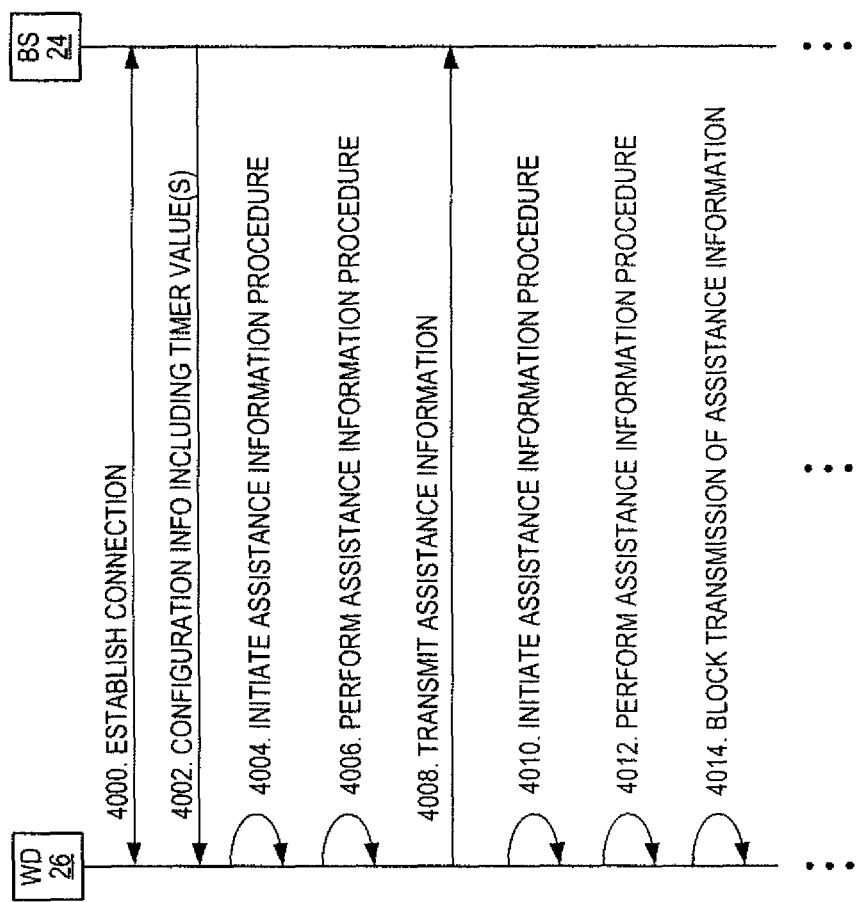
FIG. 5 illustrates the operation of the wireless device of FIG. 3 to avoid excessive signaling of assistance information to the base station via an assistance information procedure according to one embodiment of the present disclosure.
Figure 6:
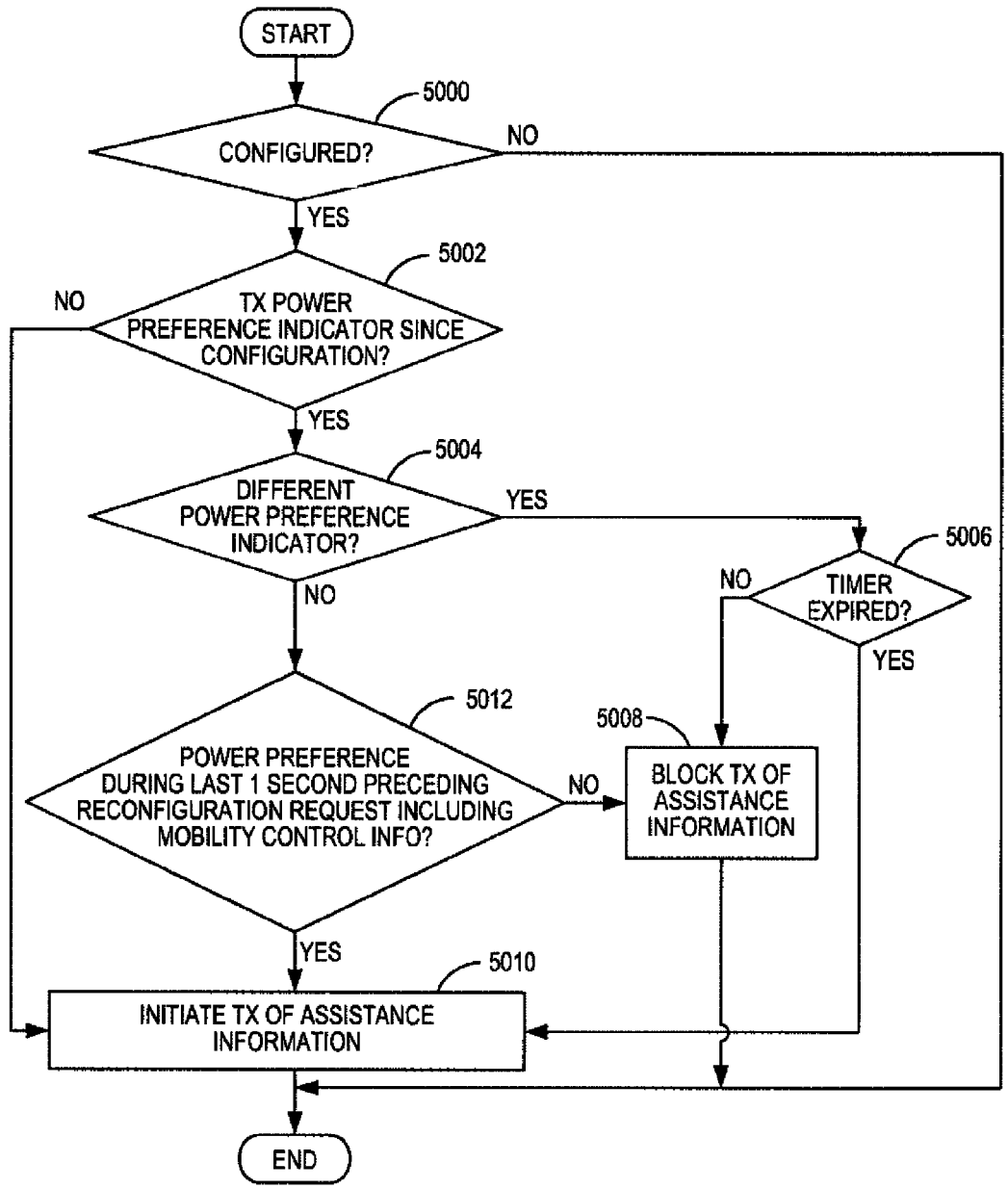
FIG. 6 is a flow chart that illustrates the assistance information procedure of FIG. 5 according to one embodiment of the present disclosure.
Figure 7:
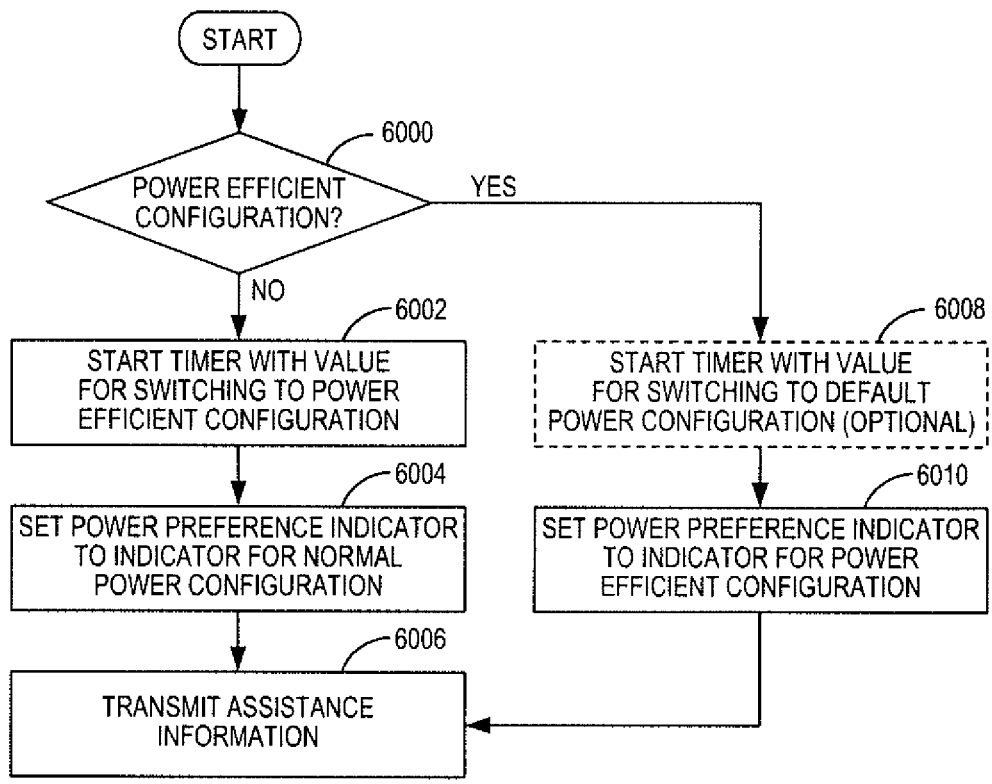
FIG. 7 is a flow chart that illustrates a transmission process initiated by the assistance information procedure of FIG. 6 according to one embodiment of the present disclosure.

FIGS. 5 through 7 illustrate the operation of the wireless device 26 of FIG. 3 to avoid excessive signaling of assistance information according to another embodiment of the present disclosure. The embodiments of FIGS. 5 through 7 illustrate a more detailed embodiment in which the wireless device 26 blocks excessive signaling of assistance information including preference indicators utilizing an assistance information procedure that either blocks transmission of the assistance information or initiates transmission of the assistance information based on a corresponding timer. More specifically, as illustrated in FIG. 5, the wireless device 26 establishes a connection to the base station 24 (step 4000). The wireless device 26 can establish the connection to the base station 24 using a random access procedure or any other suitable procedure.

Once connected, the wireless device 26 receives configuration information including one or more timer values from the base station 24 (step 4002). The configuration information includes any suitable configuration information for the wireless connection between the wireless device 26 and the base station 24 such as, for example, an initial set of DRX parameter values. In addition, the configuration information includes one or more timer values to be utilized by the wireless device 26 to block excessive signaling of assistance information, as discussed below.

In response to an appropriate triggering event, the wireless device 26 initiates an assistance information procedure (step 4004). The triggering event is generally any event that causes the wireless device 26 to attempt to transmit assistance information, including a power preference indicator, to the base station 24. For example, the triggering event may be user input from a user of the wireless device 26 that switches the wireless device 26 from a normal power mode to a power efficient mode or vice versa. As another example, the triggering event may be terminating a delay sensitive application (e.g., ending a VoIP session) while a delay insensitive application (e.g., a social networking application) remains active. Note, however, that these triggering events are only examples. As will be appreciated by one of ordinary skill in the art, the triggering events for the assistance information procedure will vary depending on the particular implementation of the wireless device 26.

Once initiated, the wireless device 26 performs the assistance information procedure (step 4006). As discussed below in detail, by performing the assistance information procedure, the wireless device 26 determines whether to block or permit transmission of assistance information. In this example, using the assistance information procedure, the wireless device 26 decides to permit transmission of assistance information. As a result, the wireless device 26 transmits assistance information including a power preference indicator to the base station 24 (step 4008). While not illustrated, the base station 24 decides whether to reconfigure the wireless connection (e.g., the DRX parameters) for the wireless device 26 based on the power preference indictor in the assistance information.

Sometime after transmitting the assistance information, the wireless device 26 again initiates the assistance information procedure in response to a triggering event (step 4010). Again, the triggering event is generally any event that causes the wireless device 26 to attempt to transmit assistance information, including a power preference indicator, to the base station 24. Once the assistance information procedure is initiated, the wireless device 26 performs the assistance information procedure to decide whether to block or permit transmission of assistance information (step 4012). In this example, using the assistance information procedure, the wireless device 26 decides to block transmission of assistance information (step 4014). This process then continues.

FIG. 6 is a flow chart that illustrates the assistance information procedure of steps 4006 and 4012 of FIG. 5 in more detail according to one embodiment of the present disclosure. Once the assistance information procedure is initiated, the wireless device 26 determines whether the wireless device 26 is configured to transmit assistance information (step 5000). More specifically, some base stations 24 may permit transmission of assistance information while other base stations 24 do not. As such, the configuration information received by the wireless device 26 in step 4002 of FIG. 5 may include an indication of whether the wireless device 26 is configured to transmit assistance information. If the wireless device is not configured to transmit assistance information, the process ends, in which case no assistance information is transmitted.

If the wireless device 26 is configured to transmit assistance information, the wireless device 26 determines whether the wireless device 26 has transmitted a power preference indicator since the wireless device 26 was configured to transmit assistance information (step 5002). If not, the process proceeds to step 5010 where the wireless device 26 initiates transmission of assistance information. However, if the wireless device 26 has transmitted a power preference indicator since the wireless device 26 was configured to transmit assistance information, the wireless device 26 determines whether a power preference indicator that the wireless device 26 desires to transmit (i.e., a current power preference indicator) is different than a most recent power preference indicator transmitted by the wireless device 26 (step 5004). If so, the wireless device 26 determines whether a timer has expired (step 5006). As discussed below, the timer was started in response to a previous transmission of a power preference indicator by the wireless device 26 or, alternatively, in response to receiving a reconfiguration request associated with a power preference indicator. If the timer has not expired, then the wireless device 26 blocks transmission of assistance information including the current power preference indicator (step 5008), and then the process ends. However, if the timer has expired, then the wireless device 26 initiates transmission of assistance information including the current power preference indicator (step 5010).

Returning to step 5004, if the current power preference indicator is not different than the most recent power preference indicator transmitted by the wireless device 26, the wireless device 26 then determines whether the wireless device 26 has transmitted a power preference indicator during the last 1 second(s) preceding reception of an RRC-ConnectionReconfiguration including mobilityControlInfo (step 5012). If not, the wireless device 26 blocks transmission of assistance information including the current power preference indicator (step 5008). Otherwise, the wireless device 26 initiates transmission of assistance information including the current power preference indicator (step 5010). Notably, the decision of step 5012 is beneficial in scenarios where, for example, the wireless device 26 transmitted assistance information including a power preference indicator to a previous base station 24 just prior to handover to the base station 24. In that case, it may be beneficial to repeat transmission of the same power preference indicator to the base station 24 after the handover.

FIG. 7 illustrates an assistance information transmission process performed by the wireless device 26 in response to initiating transmission of assistance information in step 5010 of FIG. 6 according to one embodiment of the present disclosure. First, the wireless device 26 determines whether the current power preference indicator for the wireless device 26 is the indicator for the power efficient configuration (step 6000). If not, the current power preference indicator is the preference indicator for the normal power configuration. As such, the wireless device 26 starts the timer with a value that defines an amount of time that must expire before the wireless device 26 is permitted to transmit assistance information including the preference indicator for the power efficient configuration (step 6002). The value for the timer is preferably communicated to the wireless device 26 from the base station 24 as part of the configuration information received in step 4002 of FIG. 5 and is inversely related to the delay sensitivity of one or more operations associated with the power efficient configuration. The wireless device 26 also sets a power preference indicator within user information to be transmitted to the preference indicator for the normal power configuration and then transmits the assistance information (steps 6004 and 6006). The power preference indicator may be set by setting one or more bits within the assistance information. Further, the assistance information may be transmitted using any suitable mechanism such as, for example, an RRC or MAC message.

Returning to step 6000, if the current power preference indicator is the preference indicator for the power efficient configuration, the wireless device 26 optionally starts the timer with a value that defines an amount of time that must expire before the wireless device 26 is permitted to transmit the preference indicator for the default, or normal, power configuration (step 6008). The value for the timer is inversely related to the delay sensitivity of one or more operations associated with the normal power configuration. In this embodiment, the normal power configuration is associated with one or more operations (e.g., VoIP) that are delay sensitive, or delay intolerant and, as such, the value to which the timer is set is small or even zero. In one embodiment, the value for the amount of time that must expire before the wireless device 26 is permitted to transmit the preference indicator for the normal power configuration is zero and, as such, step 6008 may not need to be performed. Particularly if the value for the timer is a non-zero value, the value for the timer is preferably communicated to the wireless device 26 from the base station 24 as part of the configuration information received in step 4002 of FIG. 5. The wireless device 26 sets the power preference indicator within the assistance information to the preference indicator for the power efficient configuration and then transmits the assistance information (steps 6010 and 6006).

To illustrate the processes of FIGS. 6 and 7, consider a scenario where the wireless device 26 transmits assistance information including the preference indicator for the normal power configuration. Since switching to the power efficient configuration is not time sensitive, the timer is set to a relatively large value (e.g., tens or hundreds of seconds) in response to transmitting the assistance information including the preference indicator. Thereafter, in response to a triggering event, the wireless device 26 initiates the assistance information process of FIG. 6. If the triggering event is associated with a preference indicator for the power efficient configuration, the wireless device 26 determines that the current power preference indicator (i.e., the indicator for the power efficient configuration) is different than the most recent preference indicator transmitted by the wireless device 26 (i.e., the indicator for the normal power configuration). As such, the wireless device 26 then determines whether the timer has expired. If not, transmission of assistance information including the current power preference indicator is blocked. However, if the timer has expired, the wireless device 26 initiates the transmission process of FIG. 7.

If the transmission process is initiated, the wireless device 26 determines that the current power preference indicator is for the power efficient configuration. Assuming in this example that the value for the timer for blocking transmission of the preference indicator for the normal power configuration is zero, the wireless device 26 does not need to set and start the timer (which is equivalent to starting the timer with a value of zero). The wireless device 26 then sets the power preference indicator in the assistance information to be transmitted to the preference indicator for the power preference indicator and transmits the assistance information to the base station 24.

Subsequently, when the assistance information procedure is triggered by an event associated with the preference indicator for the normal power configuration, the assistance information procedure initiates transmission of assistance information because the current preference indicator is different than the most recent preference indicator transmitted by the wireless device 26 (i.e., the preference indicator for the power efficient configuration) and the timer has expired. As a result, using the transmission process of FIG. 7, the wireless device 26 starts the timer with the value that defines the amount of time that must expire before transmission of the preference indicator for the power efficient configuration, sets the power preference indicator of the assistance information to the indicator for the normal power configuration, and transmits the assistance information. The process then continues in this manner.

Figure 8:
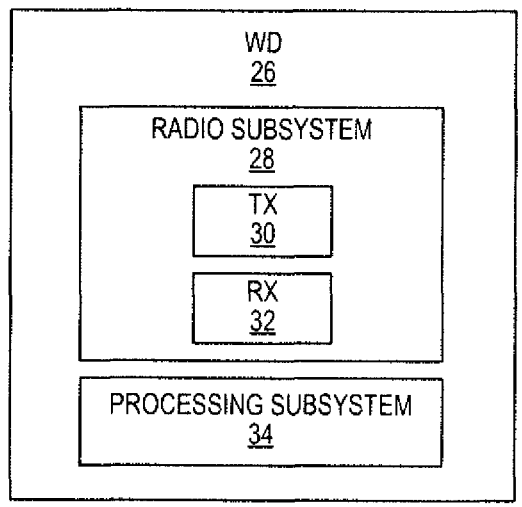
FIG. 8 is a block diagram of the wireless device of FIG. 3 according to one embodiment of the present disclosure.

FIG. 8 is a block diagram of the wireless device 26 of FIG. 3 according to one embodiment of the present disclosure. As illustrated, the wireless device 26 includes a radio subsystem 28 having a wireless transmitter 30 and a wireless receiver 32 (i.e., a radio frequency (RF) transmitter 30 and a RF receiver 32) and a processing subsystem 34. The wireless transmitter 30 and the wireless receiver 32 include analog and, in some embodiments, digital components for sending and receiving data to and from the base station 24 (FIG. 3). From a wireless communications protocol view, the radio subsystem 28 implements at least part of Layer 1 (i.e., the Physical or "PHY" Layer).

The processing subsystem 34 generally implements any remaining portion of Layer 1 as well as functions for higher layers in the wireless communications protocol (e.g., Layer 2 (data link layer), Layer 3 (network layer), etc.). In particular embodiments, the processing subsystem 34 may comprise, for example, one or several general-purpose or special-purpose microprocessors or other microcontrollers programmed with suitable software and/or firmware to carry out some or all of the functionality of the wireless device 26 described herein. In addition or alternatively, the processing subsystem 34 may comprise various digital hardware blocks (e.g., one or more Application Specific Integrated Circuits (ASICs), one or more off-the-shelf digital and analog hardware components, or a combination thereof) configured to carry out some or all of the functionality of the wireless device 26 described herein. Additionally, in particular embodiments, the above-described functionality of the wireless device 26 may be implemented, in whole or in part, by the processing subsystem 34 executing software or other instructions stored on a non-transitory computer-readable medium, such as Random Access Memory (RAM), Read Only Memory (ROM), a magnetic storage device, an optical storage device, or any other suitable type of data storage components. Of course, the detailed operation for each of the functional protocol layers, and thus the radio subsystem 28 and the processing subsystem 34, will vary depending on both the particular implementation as well as the standard or standards supported by the wireless device 26.

Figure 9:
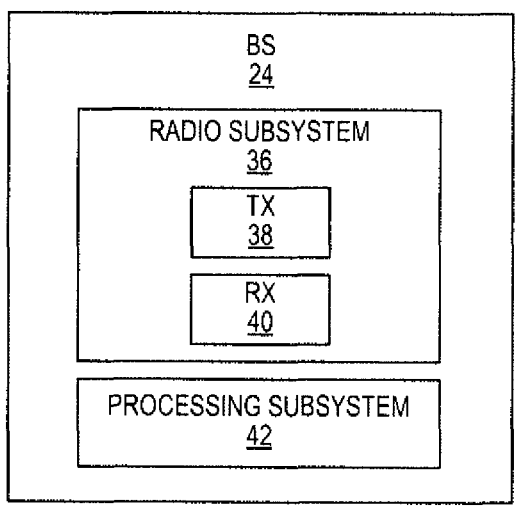
FIG. 9 is a block diagram of the base station of FIG. 3 according to one embodiment of the present disclosure.

FIG. 9 is a block diagram of the base station 24 of FIG. 3 according to one embodiment of the present disclosure. As illustrated, the base station 24 includes a radio subsystem 36 having a wireless transmitter 38 (i.e. a RF transmitter) and a wireless receiver 40 (i.e., a RF receiver) and a processing subsystem 42. The wireless transmitter 38 and the wireless receiver 40 generally include analog and, in some embodiments, digital components for sending and receiving data to and from wireless devices (e.g., the wireless device 26) within the corresponding cell. From a wireless communications protocol view, the radio subsystem 36 implements at least part of Layer 1 (i.e., the Physical or "PHY" Layer).

The processing subsystem 42 generally implements any remaining portion of Layer 1 not implemented in the radio subsystem 36 as well as functions for higher layers in the wireless communications protocol (e.g., Layer 2 (data link layer), Layer 3 (network layer), etc.). In particular embodiments, the processing subsystem 42 may comprise, for example, one or several general-purpose or special-purpose microprocessors or other microcontrollers programmed with suitable software and/or firmware to carry out some or all of the functionality of the base station 24 described herein. In addition or alternatively, the processing subsystem 42 may comprise various digital hardware blocks (e.g., one or more ASICs, one or more off-the-shelf digital and analog hardware components, or a combination thereof) configured to carry out some or all of the functionality of the base station 24 described herein. Additionally, in particular embodiments, the above described functionality of the base station 24 may be implemented, in whole or in part, by the processing subsystem 42 executing software or other instructions stored on a non-transitory computer-readable medium, such as RAM, ROM, a magnetic storage device, an optical storage device, or any other suitable type of data storage components.

The following acronyms are used throughout this disclosure.

| | |
|---|---|
| 3GPP | 3rd Generation Partnership Project |
| ASIC | Application Specific Integrated Circuit |
| BS | Base Station |
| DRX | Discontinuous Reception |
| eDDA | Enhancements for Diverse Data Applications |
| eNB | eNodeB |
| E-UTRAN | Evolved Universal Terrestrial Radio Access Network |
| LTE | Long Term Evolution |
| MAC | Media Access Control |
| RAM | Random Access Memory |
| RAN | Radio Access Network |
| Rel-11 | Release 11 |
| RF | Radio Frequency |
| ROM | Read Only Memory |
| RRC | Radio Resource Control |
| RX | Receive or Receiver |
| SAE | System Architecture Evolution |
| TS | Technical Specification |
| TX | Transmit or Transmitter |
| UE | User Equipment or User Element |
| VoIP | Voice over Internet Protocol |
| WCDMA | Wideband Code Division Multiple Access |
| WD | Wireless Device |
| WG2 | Work Group 2 |
| WI | Work Item |

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device in a cellular communications network, the wireless device comprising a wireless transmitter and a wireless receiver, the method comprising:
identifying a preference for a first configuration impacting power consumption of the wireless device;
starting a timer in response to identifying the preference for the first configuration;
transmitting a preference indicator for the first configuration via the wireless transmitter, the timer being set to a value that defines an amount of time before the wireless device is permitted to transmit a preference indicator for a second configuration impacting power consumption of the wireless device, the second configuration being different than the first configuration; and
blocking transmission of the preference indicator for the second configuration until the timer has expired.

2. The method of claim 1 wherein the value that defines the amount of time before the wireless device is permitted to transmit the preference indicator for the second configuration is inversely related to a delay sensitivity of operations associated with the second configuration.

3. The method of claim 1 further comprising:
identifying a preference for the second configuration;
setting a preference indicator to indicate the preference for the second configuration; and
transmitting the preference indicator for the second configuration via the wireless transmitter after the timer has expired.

4. The method of claim 3 further comprising:
identifying a preference for the first configuration;
restarting the timer, the timer set to the value that defines the amount of time before the wireless device is permitted to transmit the preference indicator for the second configuration impacting power consumption of the wireless device in response to identifying the preference for the first configuration; and blocking transmission of the preference indicator for the second configuration impacting power consumption of the wireless device until the timer has expired.

5. The method of claim 4 wherein the value that defines the amount of time before the wireless device is permitted to transmit the preference indicator for the first configuration is different than the value that defines the amount of time before the wireless device is permitted to transmit the preference indicator for the second configuration.

6. The method of claim 4 wherein:
the timer set to the value that defines the amount of time before the wireless device is permitted to transmit the preference indicator for the first configuration is the same timer set to the value that defines the amount of time before the wireless device is permitted to transmit the preference indicator for the second configuration; and
the value that defines the amount of time before the wireless device is permitted to transmit the preference indicator for the first configuration is different than the value that defines the amount of time before the wireless device is permitted to transmit the preference indicator for the second configuration.

7. The method of claim 4 further comprising transmitting the preference indicator for the first configuration via the wireless transmitter after the timer set to the value that defines the amount of time before the wireless device is permitted to transmit the preference indicator for the first configuration has expired.

8. The method of claim 1 wherein the preference indicator for the first configuration is a preference indicator for a normal power configuration, and the preference indicator for the second configuration is a preference indicator for a power efficient configuration, and wherein the wireless device consumes less power during operation when operating in the power efficient configuration than when operating in the normal power configuration.

9. The method of claim 8 wherein the normal power configuration and the power efficient configuration are configurations for a discontinuous reception mode of operation of the wireless device while in a connected state.

10. The method of claim 8 further comprising transmitting the preference indicator for the power efficient configuration via the wireless transmitter after the timer has expired.

11. The method of claim 1 wherein the preference indicator for the first configuration is a preference indicator for a power efficient configuration, and the preference indicator for the second configuration is a preference indicator for a normal power configuration, and wherein the wireless device consumes less power during operation when operating in the power efficient configuration.

12. The method of claim 11 wherein the normal power configuration and the power efficient configuration are configurations for a discontinuous reception mode of operation of the wireless device while in a connected state.

13. The method of claim 11 further comprising transmitting the preference indicator for the normal power configuration via the wireless transmitter after the timer has expired.

14. The method of claim 13 further comprising:
identifying a preference for the normal power configuration prior to transmitting the preference indicator for the normal power configuration;
starting the timer set to the value that defines the amount of time before the wireless device is permitted to transmit the preference indicator for the power efficient configuration in response to identifying the preference for the normal power configuration; and blocking transmission of the preference indicator for the power efficient configuration until the timer set to the value that defines the amount of time before the wireless device is permitted to transmit the preference indicator for the power efficient configuration has expired.

15. The method of claim 14 further comprising transmitting the preference indicator for the power efficient configuration via the wireless transmitter after the timer set to the value that defines the amount of time before the wireless device is permitted to transmit the preference indicator for the power efficient configuration has expired.

16. The method of claim 1 wherein blocking transmission of the preference indicator for the second configuration until the timer has expired comprises:
initiating an assistance information procedure; and
performing the assistance information procedure to determine whether to block or initiate transmission of assistance information including a preference indicator for a desired power configuration.

17. The method of claim 16 wherein performing the assistance information procedure comprises:
determining whether the preference indicator for the desired power configuration is the preference indicator for the second configuration, which is different than the preference indicator for the first configuration; and
if the preference indictor for the desired power configuration is the preference indicator for the second configuration:
determining whether the timer has expired;
if the timer has not expired, blocking transmission of the assistance information including the preference indicator for the second configuration; and
if the timer has expired, initiating transmission of the assistance information including the preference indicator for the second configuration.

18. The method of claim 17 further comprising, in response to initiating transmission of the assistance information:
determining whether the preference indicator for the second configuration is a preference indicator for a power efficient configuration; and
if the preference indicator is the preference indicator for the power efficient configuration:
setting a power preference indicator for the assistance information to the preference indicator for the power efficient configuration; and
transmitting the assistance information comprising the power preference indicator via the wireless transmitter.

19. The method of claim 18 wherein the preference indicator for the first configuration is a preference indicator for a normal power configuration, and the preference indicator for the second configuration is the preference indicator for the power efficient configuration, and wherein the wireless device consumes less power during operation when operating in the power efficient configuration than when operating in the normal power configuration.

20. The method of claim 1 wherein the value that defines the amount of time before the wireless device is permitted to transmit the preference indicator for the second configuration is greater than or equal to zero.

21. The method of claim 1 wherein the value that defines the amount of time before the wireless device is permitted to transmit the preference indicator for the second configuration is greater than zero.

22. A wireless device in a cellular communications network, comprising:
- a wireless transmitter;
- a wireless receiver; and
- a processing subsystem associated with the wireless transmitter and the wireless receiver configured to:
  - identify a preference for a first configuration; impacting power consumption of the wireless device
  - start a timer in response to identifying the preference for the first configuration;
  - transmit a preference indicator for the first configuration via the wireless transmitter, the timer being set to a value that defines an amount of time before the wireless device is permitted to transmit a preference indicator for a second configuration impacting power consumption of the wireless device; and
  - block transmission of the preference indicator for the second configuration until the timer has expired.

* * * * *